(12) United States Patent
Van Till et al.

(10) Patent No.: US 6,404,337 B1
(45) Date of Patent: Jun. 11, 2002

(54) SYSTEM AND METHOD FOR PROVIDING ACCESS TO AN UNATTENDED STORAGE

(75) Inventors: Stephen Van Till, Ellicott City, MD (US); Stephen Ezell, Washington, DC (US)

(73) Assignee: Brivo Systems, Inc., Arlington, VA (US)

( * ) Notice: Subject to any disclaimer, the term of this patent is extended or adjusted under 35 U.S.C. 154(b) by 0 days.

(21) Appl. No.: 09/698,103

(22) Filed: Oct. 30, 2000

Related U.S. Application Data

(60) Provisional application No. 60/198,387, filed on Apr. 19, 2000, provisional application No. 60/161,926, filed on Oct. 28, 1999, and provisional application No. 60/161,921, filed on Oct. 28, 1999.

(51) Int. Cl.[7] .............................................. G08B 13/14
(52) U.S. Cl. ...................... 340/569; 340/568.1; 705/75; 705/77; 713/176
(58) Field of Search ............................. 340/539, 568.1, 340/571, 5.8, 569; 705/20, 23, 27, 65, 53, 35, 52, 77, 75; 713/170, 176, 194

(56) References Cited

U.S. PATENT DOCUMENTS

| 4,814,592 A | 3/1989 | Bradt et al. ................. 235/381 |
|---|---|---|
| 5,091,713 A | 2/1992 | Horne et al. ................ 340/541 |
| 5,247,282 A | 9/1993 | Marshall ..................... 340/569 |
| 5,313,393 A | 5/1994 | Varley et al. ................. 705/28 |
| 5,385,265 A | 1/1995 | Schlamp ........................ 221/7 |
| 5,386,462 A | 1/1995 | Schlamp ................. 379/93.12 |
| 5,431,250 A | 7/1995 | Schlamp ...................... 186/55 |
| 5,467,892 A | 11/1995 | Schlamp ........................ 221/7 |
| 5,482,139 A | 1/1996 | Rivalto ........................ 186/36 |
| 5,661,291 A | 8/1997 | Ahearn et al. ......... 235/462.46 |
| 5,774,053 A * | 6/1998 | Porter ..................... 340/568.1 |
| 5,910,163 A | 6/1999 | Schlamp ...................... 62/256 |
| 5,917,411 A | 6/1999 | Baggarly ..................... 340/569 |
| 5,950,919 A | 9/1999 | Adams ........................ 340/569 |
| 5,960,408 A | 9/1999 | Martin et al. .................. 705/11 |
| 5,970,475 A * | 10/1999 | Barnes et al. ................. 340/5.8 |
| 5,988,346 A | 11/1999 | Tedesco et al. ............. 194/217 |
| 6,076,078 A * | 6/2000 | Camp et al. ................... 705/65 |
| 6,088,717 A * | 7/2000 | Reed et al. .................. 709/201 |
| 6,167,378 A * | 12/2000 | Webber, Jr. ..................... 705/8 |
| 6,185,683 B1 * | 2/2001 | Ginter et al. ................ 713/176 |

FOREIGN PATENT DOCUMENTS

| EP | 9314571 | 7/1993 |
|---|---|---|
| EP | 0855673 | 7/1998 |
| WO | WO 96 13015 | 5/1996 |
| WO | WO 99 04364 | 1/1999 |

* cited by examiner

*Primary Examiner*—V Trieu
(74) *Attorney, Agent, or Firm*—Baker Botts L.L.P.

(57) ABSTRACT

In one embodiment of the present invention, a system for access to an unattended storage device is described. The system includes a first transmitter for placing an order for an item with a merchant; a second transmitter for transmitting a request for a pick-up of the item; a tracking information generator for generating tracking information in response to a request for a pick-up of the item; a transceiver for receiving and transmitting the tracking information; a memory for storing the tracking information; a third transmitter for transmitting the tracking information to a storage device a comparator for comparing the tracking information transmitted to the storage device to the tracking information stored in the memory; and a digital signature generator for creating a digital signature. In another embodiment of the present invention, a method of providing remote access to a storage device is described. The method includes the steps of transmitting tracking information to a storage device; and gaining access to an interior of the storage device if the tracking information transmitted to the storage device matches tracking information stored in a memory.

79 Claims, 11 Drawing Sheets

SYSTEM AND METHOD FOR PROVIDING ACCESS TO AN UNATTENDED STORAGE

The present application claims priority from U.S. Provisional Patent Application No. 60/198,387, filed Apr. 19, 2000 entitled "System and Method for Providing Access to a Unattended Storage Device;" U.S. Provisional Patent Application No. 60/161,926, filed Oct. 28, 1999 entitled "Digital Signature for Unattended Delivery System;" and U.S. Provisional Patent Application No. 60/161,921, filed Oct. 28, 1999 entitled "Portable Handheld Device For Remote Shopping Situations," the disclosures of which are hereby incorporated by reference in their entirety.

BACKGROUND OF THE INVENTION

1. Field of the Invention

The invention relates generally to the field of unattended storage devices. Specifically, the invention is directed to a system and method for remotely opening an unattended storage device.

2. Description of Related Art

A homeowner (or businessperson) may want to be able to receive and send valuable parcels from his or her home when he or she is not at home (or at work). Households that participate actively in customer-direct commerce already may avail themselves of an unattended delivery solution that provides a secure storage device (or storage bin), which may be connected to a communication network (e.g., the Internet). Such storage devices are described in U.S. Pat. No. 5,774,053, entitled "Storage Device for the Delivery and Pick-up of Goods," the disclosure of which is incorporated by reference in its entirety. The system disclosed in U.S. Pat. No. 5,774,053 provides a secure enclosure that enables both inbound delivery and outbound pick-up. A similar storage device also might be an unattended home delivery storage device, such as that described in U.S. Provisional Patent Application No. 60/161,922, filed Oct. 28, 1999, the disclosure of which is hereby incorporated by reference in its entirety.

Despite the presence of such storage devices, unattended delivery does not provide the carrier with a human signature at the time of delivery. This lack of a signature authorization may create a chain of custody issue, because merchants generally hold the carrier liable for shipped goods until the consumer provides an acknowledgement of the receipt of goods.

Further, on many occasions, customers may desire to make purchases in remote locales, or even in familiar ones, such as in a large city, but cannot easily transport their purchases home. For example, a customer might be on vacation and unable to get many products home in the limited baggage space available. Alternatively, the customer might live in a large city and not have access to personal transportation. Such customers (or business person) may want to be able to receive valuable or heavy parcels at his or her home (or office) regardless whether he or she is not at home (or at work). Such customers may avail themselves of an unattended delivery solution that provides a secure storage device, which may be connected to the communication network (e.g., the Internet).

SUMMARY OF THE INVENTION

Therefore, a need has arisen for a method that overcomes these and other shortcomings of the related art. A technical advantage of the present invention is that a system and method for providing a digital signature for an unattended delivery system is provided. Another technical advantage of the present invention is that the unattended storage device may use an item's tracking number as an access code. Still another technical advantage of the present invention is that a portable handheld device may be used to provide access to a logistic company's (e.g, shipping company's) representative by scanning in a bar code, and transmitting the bar code to a storage device.

According to an embodiment of the present invention, a method for delivery to an unattended storage device and receiving a digital signature is described. The method includes the steps of receiving tracking information; obtaining a digital signature, where the digital signature is created by processing the tracking information; and transmitting the digital signature to a third party.

In another embodiment, a method for registering a digital signature is described. The method includes the steps of registering a customer with a certificate authority; creating a private key; creating a public key; and granting a third party access to the public key.

In yet another embodiment of the present invention, a method for delivery to unattended storage device and receiving a digital signature is described. The method includes the steps of receiving an order for an item from a customer; requesting pick-up of the item from a logistics company; and receiving a digital signature, where the digital signature is created by processing the tracking information.

In still another embodiment of the present invention, a method for delivery to unattended storage device and receiving a digital signature is described. The method includes the steps of receiving a request for a pick-up of an item; transmitting tracking information to a storage device; and receiving a digital signature, where the digital signature is created by processing the tracking information.

In a further embodiment of the present invention, a method of providing remote access to a storage device is described. The method includes the steps of transmitting tracking information to a storage device; gaining access to an interior of the storage device if the tracking information transmitted to the storage device matches tracking information stored in a memory. In one embodiment, a digital signature may be transmitted if there is a match, and at least one notification may be provided.

In yet a further embodiment, a method for providing remote access to a storage device for the pick-up of an item is described. The method includes the steps of receiving a request for a pick-up of an item; generating tracking information for the item; transmitting the tracking information to a memory; transmitting the tracking information to the storage device; and gaining access to the interior of the storage device, if the tracking information transmitted to the storage device matches the tracking information stored in the memory.

In still a further embodiment of the present invention, a system for delivery to an unattended storage device is described. The system includes a first transmitter for placing an order for an item with a merchant; a second transmitter for transmitting a request for a pick-up of the ordered item; a tracking information generator for generating tracking information in response to a request for a pick-up of the item; a transceiver for receiving and transmitting the tracking information; a memory for storing the tracking information; a third transmitter for transmitting the tracking information to a storage device a comparator for comparing the tracking information transmitted to the storage device to the tracking information stored in the memory; and a digital signature generator for creating a digital signature.

Other objects, features, and advantages will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which.

DETAILED DESCRIPTION OF PREFERRED EMBODIMENTS

Figure 1:
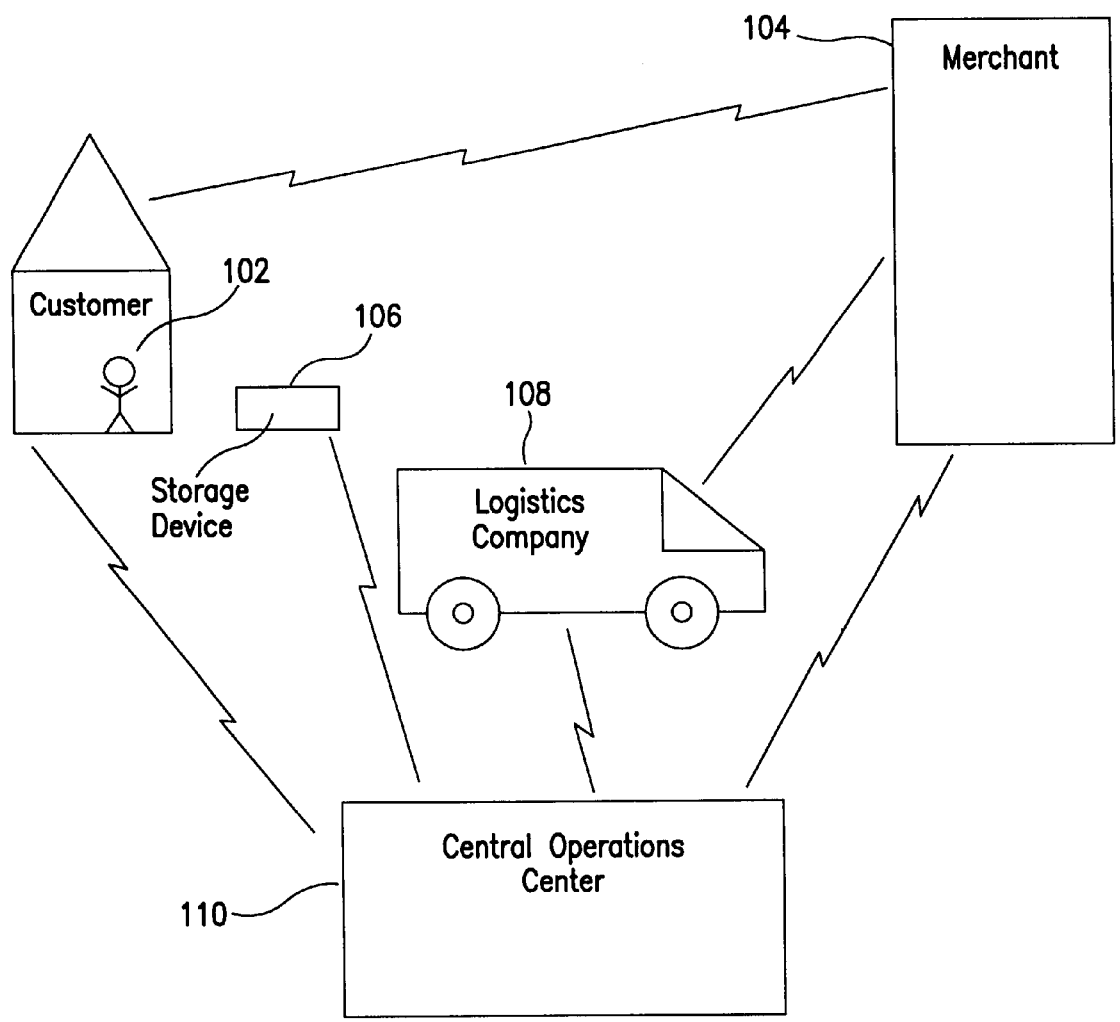
FIG. 1 is a schematic of an unattended delivery system according to an embodiment of the present invention.

Preferred embodiments of the present invention and their advantages may be understood by referring to FIGS. 1–11, like numerals being used for like corresponding parts in the various drawings.

The present invention extends the utility of unattended storage devices to enable the customer to provide a digital signature at times when the customer is not present to physically sign for a parcel. With this invention, an unattended delivery may result in the customer receiving the parcel, the delivery agent (or logistics company) receiving signature confirmation/authorization, and the sender receiving the delivery/receipt assurances that they are seeking. Any party with a tracking number for the unattended delivery could verify the signature by logging online or requesting a copy from the delivery agent.

Further, the present invention extends the utility of handheld portable units to enable customers to make, pay for, and provide delivery instructions for purchases. The handheld device may enable customers to make purchases while they are away from home or in places from which they do not want to or cannot transport their purchases and to have those purchases delivered to their home (or office).

The customer utilizing an unattended delivery device may enable a digital signature in several ways: (1) by providing a blanket signature authorization card on file at the storage device central operations center; (2) by providing a signature on a case-by-case basis when a parcel is sent requiring a signature; (3) by providing a real-time signature from a remote location; or (4) by providing other real-time authorization which is translated into a digital signature. The first of these forms is the most simple and convenient, but provides the lowest level of control. It is possible that a combination of these solutions may be used, depending on the sensitivity or value of the delivery being made.

In general, once a pre-authorized digital signature is obtained, the digital signature may be passed to the storage device either by translating it into a code that represents the signature, or by converting an actual signature into a digitized string and sending that digitized string to the storage device. The information may be stored locally in the memory of the storage device, awaiting delivery, or it may be stored at the central operations center and sent directly to the logistics company once it is demonstrated that the parcel was delivered and a digital signature is required. The proof may be via a pre-authorized relationship with the logistics company (e.g., Federal Express, or the United Parcel Service, United States Postal System), or a data input mechanism to confirm the presence of the parcel, including a bar code scanner, IR device, digital camera, or the like.

Upon delivery of the parcel, the digital signature may be passed to the logistics company in several ways, including beaming the data to/from an IR port (similar to the IR port on the Palm V™ PDA or on the current UPS® DIAD III™ handheld tablet), connection to a handheld device using cable, imprint from a digital stamping device integrated into the storage device, or the like. This transaction also may include sending the digital signature directly to the sender of the parcel (e.g., the merchant). This would have the dual benefit of providing the digital signature directly and confirming receipt of the parcel. Alternatively, the confirmation of receipt to the sender may be withheld until the recipient is physically present at the storage device and removes the parcel.

Referring to FIG. 1, a schematic of unattended home delivery system 100 is described. Customer 102 may purchase merchandise from merchant 104, which may be a merchant operating a web-site on the Internet. Customer 102 may have unattended storage device 106 at his or her service. When customer 102 purchases merchandise from merchant 104, it is delivered-by logistics company 108 to storage device 106. Customer 102 subscribes to the pick-up and delivery services of central operations center 110, which communicates with merchant 104, logistics company 108, storage device 106, and customer 102.

Figure 2:
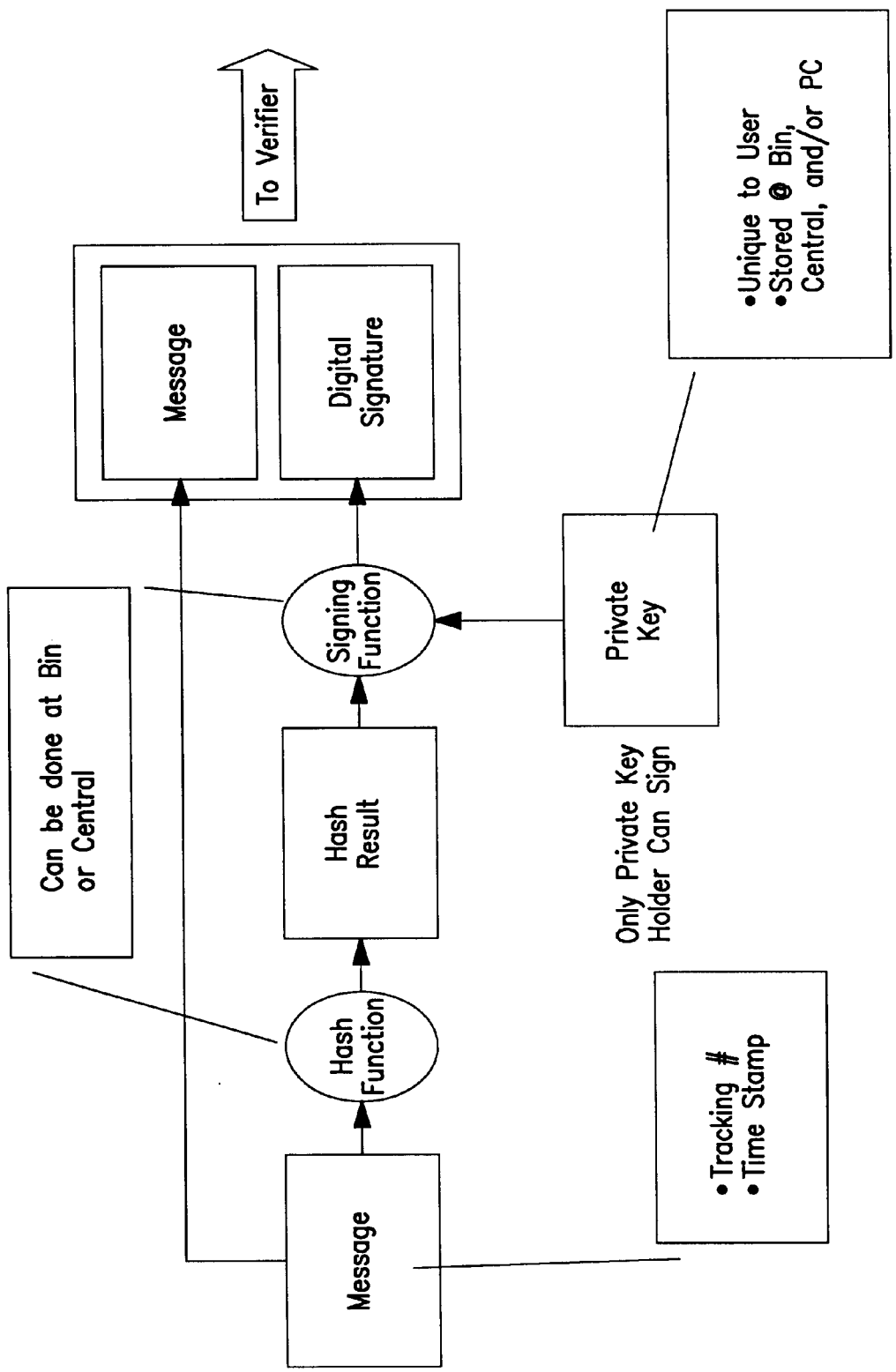
FIG. 2 is a flowchart of a method for creating a digital signature according to an embodiment of the present invention.

Referring to FIG. 2, a method for creating a digital signature according to a first embodiment of the present invention is described. In this embodiment, once an item is delivered to an unattended storage device (or storage bin), the storage device creates a message, which may include the tracking number for the item and a time stamp. The message is processed by a hash function. The hash function is an algorithm, which converts messages or text into a fixed string of digits, known as a hash result. This hash result may be substantially smaller than the text itself. Further, because the hash result is generated by a particular formula, it may be highly unlikely that some other message or text will produce the same hash result. The hash result may be processed through a signing function. The signing function may use a private key to create the digital signature. The private key is unique to the customer, and may be stored at the storage device, central operations center, the customer's personal computer, the customer's hand held device, or a combination of these locations. Once the digital signature is created, it is transmitted, with the message, to the verifier, which may be a logistics company, such as Federal Express, United Parcel Service or the United States Parcel Service, or the like. Once the digital signature is verified, it may be transmitted to the merchant and also may be transmitted to the central operations center. The digital signature may be transmitted directly to the merchant or the central operations center, or, alternatively, also may be transmitted indirectly via the logistics company.

In a modification of the above-described first embodiment, the hash function and the signing function may be accomplished at the central operations center. This may depend on, inter alia, the speed of connection. For example, if the system is running at approximately real-time, it may be desirable to have these functions performed at the central operations center. If there is a delay in communications between the storage device and the central operations center, it may be desirable to have these functions performed at the storage device, so that the delivery agent does not have to wait for processing before he or she may leave the vicinity of the storage device. Other factors may be considered as warranted.

In another modification of the above-described first embodiment, the hash function and the signing function may be accomplished by the merchant or by a third party.

Figure 3:
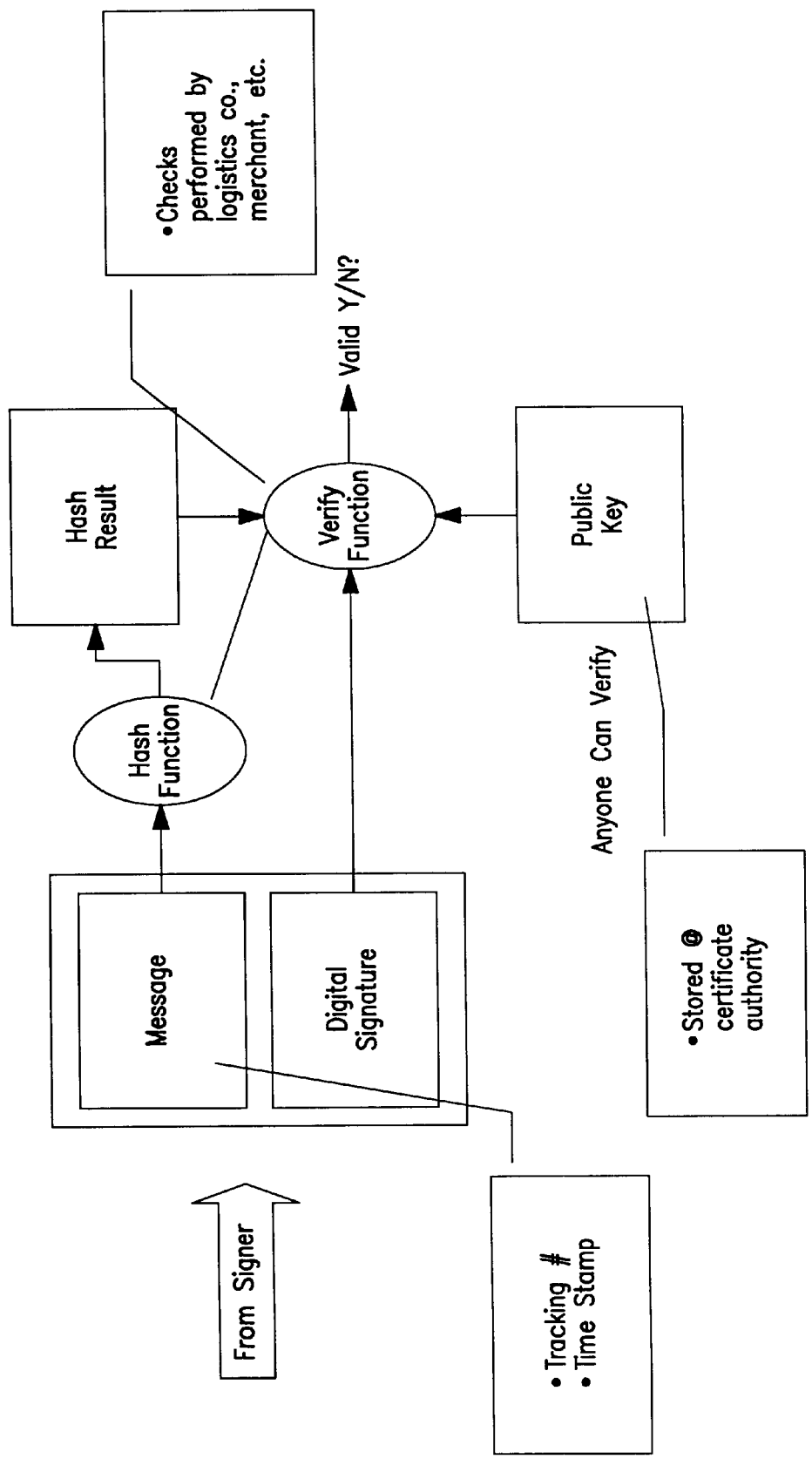
FIG. 3 is a flowchart of a method for verifying a digital signature according to an embodiment of the present invention.

Referring to FIG. 3, once the tracking information is processed, the message and digital signature are received from the storage device (the "signer"). Alternatively, the message and digital signature may be received from the central operations center, or a third party. The message then is processed a hash function, providing a hash result. The digital signature and the hash function are passed to a verify function, which may verify the validity of the transaction. A public key may be used in conjunction with the verify function, and the public key may be stored with a certificate authority. The verification may be performed by any party, including the logistics company.

Figure 4:
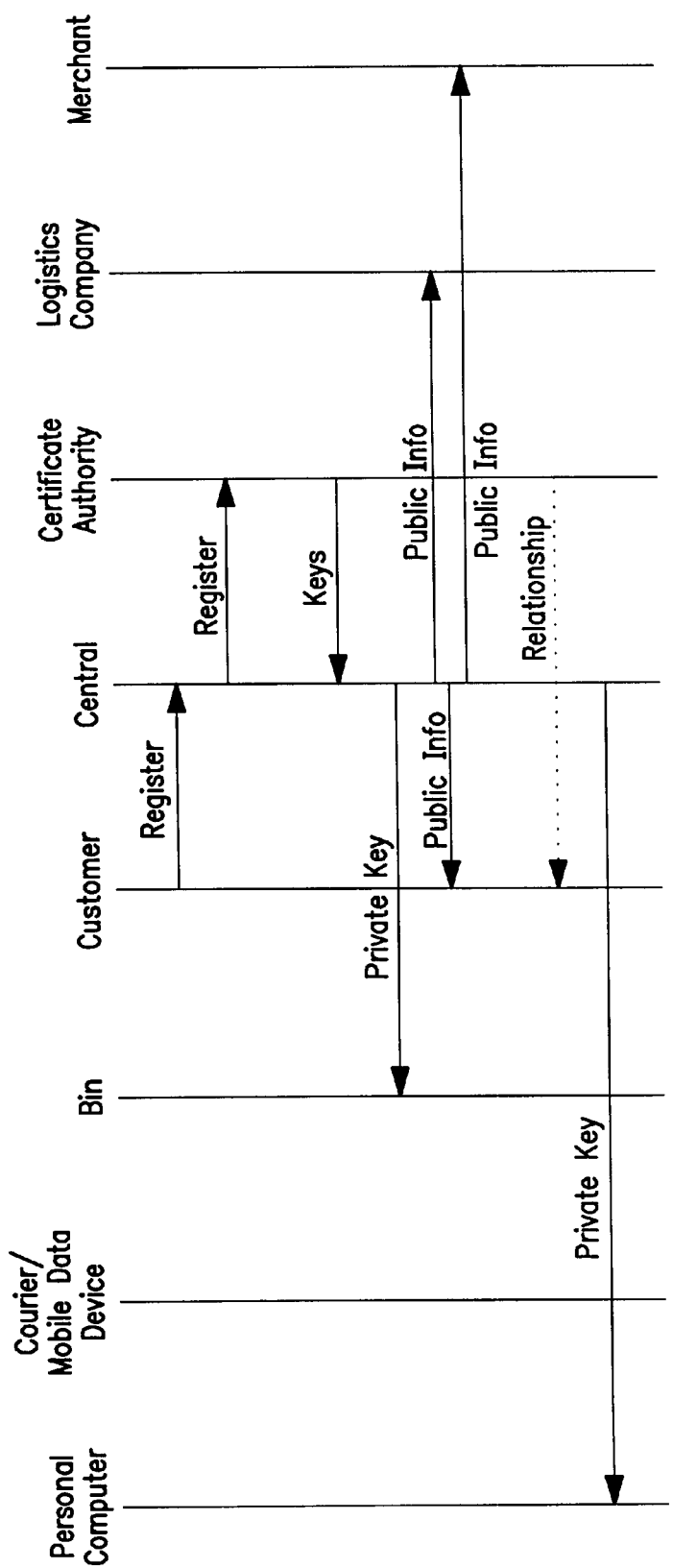
FIG. 4 is a flowchart of a method for registration according to an embodiment of the present invention.

Referring to FIG. 4, a method for registration according to a second embodiment of the present invention is provided. First, the customer in control of the storage device may be registered with the central operations center. This may include creating a customer profile, which may include sufficient customer information to validate the identity of the customer. This may include customer information such as, inter alia, a driver's license, social security information, mother's maiden name, passwords, and the like.

Further, the customer may be registered with the certificate authority, either by the verifying authority or by a third party. The central operations center may serve as the certificate authority, as depicted in FIG. 4. In a modification of the above-described second embodiment, a third party may serve as the certificate authority. For example, this third party may be a company such as VeriSign, Inc. of Mountain View, Calif. The certificate authority may store the information on the customer, and may create a private key, or a certificate, for the customer. The certificate authority also may create a public key. The central operations center may be granted access to both the private and public keys, and the private key may be passed to the storage device for storage, or alternatively, may be retained by the certificate authority. Further, the logistics company, merchant, and the customer may be granted access to the public key. In a modification of the above-described second embodiment, the private key may be stored on the customer's personal computer. At the completion of the registration process, a relationship between the certificate authority and the customer is established.

Figure 5:
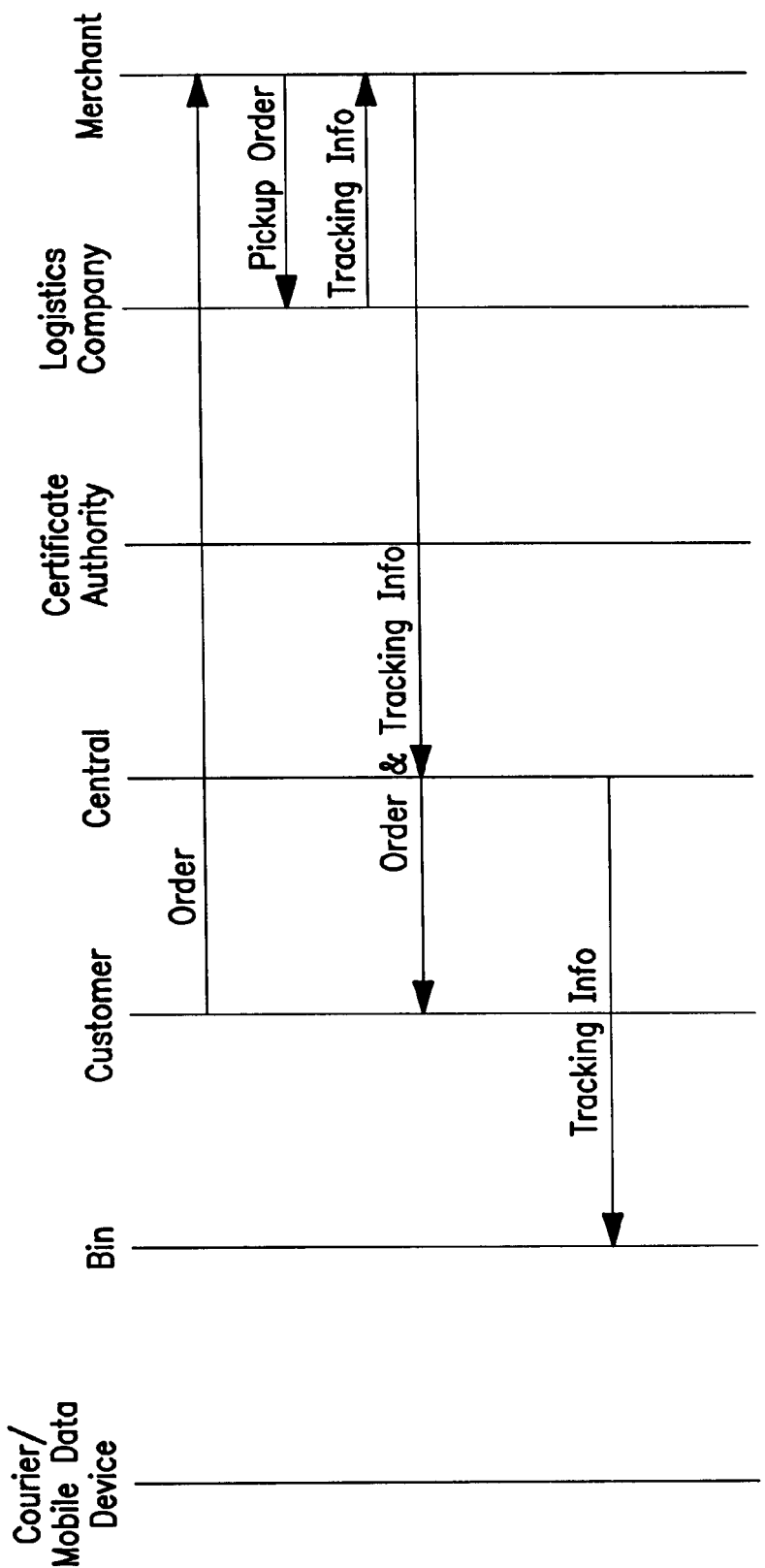
FIG. 5 is a flowchart of a method of staging for an on-line order according to an embodiment of the present invention.

Referring to FIG. 5, a method of delivery to unattended storage device and receiving a digital signature according to the third embodiment of the present invention, is described. First, the merchant may receive an order from the customer for an item. The merchant, may transmit information to the logistics company, and request the pick-up of the item from the logistics company. Further, the logistics company may transmit tracking information to the merchant, which may include tracking number, estimated delivery date, delivery address, or any information that may facilitate the delivery of the item. Moreover, the merchant may transmit the tracking information to the central operations center, which may transmit the tracking information to the storage device or the customer. Alternatively, the logistics company may transmit the tracking information directly to the storage device.

In a modification of the above-described third embodiment, the tracking information may be transmitted to the central operations center from the logistics company. In this modification, the order and tracking information may be sent to the central operations center, and then to the customer. The tracking information also may be sent from the logistics company to the storage device indirectly via the central operations center or the merchant.

In the third embodiment, or alternatively in the modified embodiment, the tracking information may be processed to produce a digital signature, as described in the first embodiment of the present invention. Further, the digital signature may be transmitted to the merchant, and also may be transmitted to the central operations center and the logistics company. The communications described above may be accomplished in several ways, including by electronic mail, telephone, wireless, or any suitable transmission method.

Moreover, there are numerous ways that the information flow may be implemented. In particular, information about tracking numbers and order details may be provided to central operations center by the merchant, the logistics company, or both. Further, some of the steps in the method may be accomplished simultaneously or in different orders, where desirable.

Figure 6:
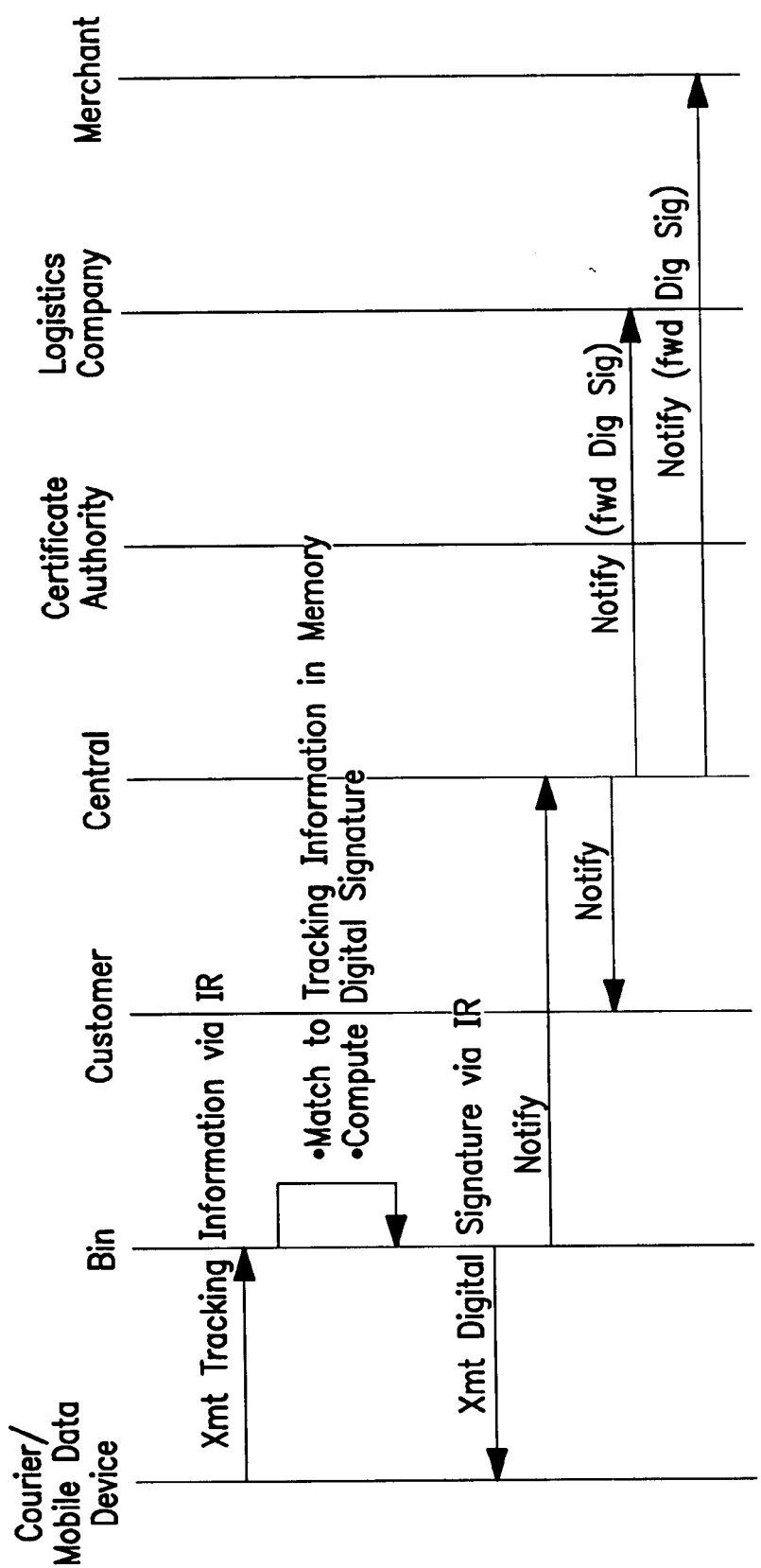
FIG. 6 is a method for remote access to an unattended delivery device according to an embodiment of the present invention.

Referring to FIG. 6, a method for remote access to an unattended storage device with a digital signature according to a fourth embodiment of the present invention is described. First, the logistics company (or a representative therefrom) may transmit the tracking information to the storage device. Alternatively, the tracking information first may be transmitted to a handheld device and then transmitted to the storage device. For example, a PDA-based device, such as a Palm III™ PDA, Palm V™ PDA, or Palm VII™ PDA, or a similar handheld device, may be used.: Alternatively, SPT1700 device manufactured by Symbol Technologies, Inc. of Holtsville, N.Y., may be used. This device may include additional transmission devices, such as a laser scanner for reading bar codes, an infrared port, a RF transmitter/receiver, or the like. In another embodiment, the current UPS® DIAD III™ handheld tablet may be used. In yet another embodiment, the FedEx® SuperStick™ may be used. Other suitable portable handheld devices also are within the contemplation of the present invention. Transmission from the handheld device to the storage device may be accomplished by infrared (IR) transmission, radio frequency (RF) transmission, wireless transmission, or the like. Further, the tracking information also may be transmitted to the storage device via a third party. The tracking information then may be processed to determine whether the tracking information matches tracking information stored in a memory, and the digital signature may be computed. If the tracking information matches information stored in the memory, the storage device may open to accept delivery of the item.

In a modification of the above-described fourth embodiment, processing the tracking information may be accomplished by the storage device or, alternatively, by the central operations center, which may include transmissions to and from the central operations center.

Further, the storage device may transmit the digital signature in response to a match. This again may be achieved through IR transmission, RF transmission, wireless transmission, or the like. In a modification of the above-described fourth embodiment, the digital signature may be transmitted to the logistics company. In a further modification, once the digital signature is sent, notification may be provided to the central operations center, which in turn may notify the customer, or the logistics company, or the merchant, or a combination thereof. Digital signatures may be provided with the notification, as desired. In yet another modification, the digital signature may be generated or transmitted after the access door to the storage device has been closed.

Figure 7:
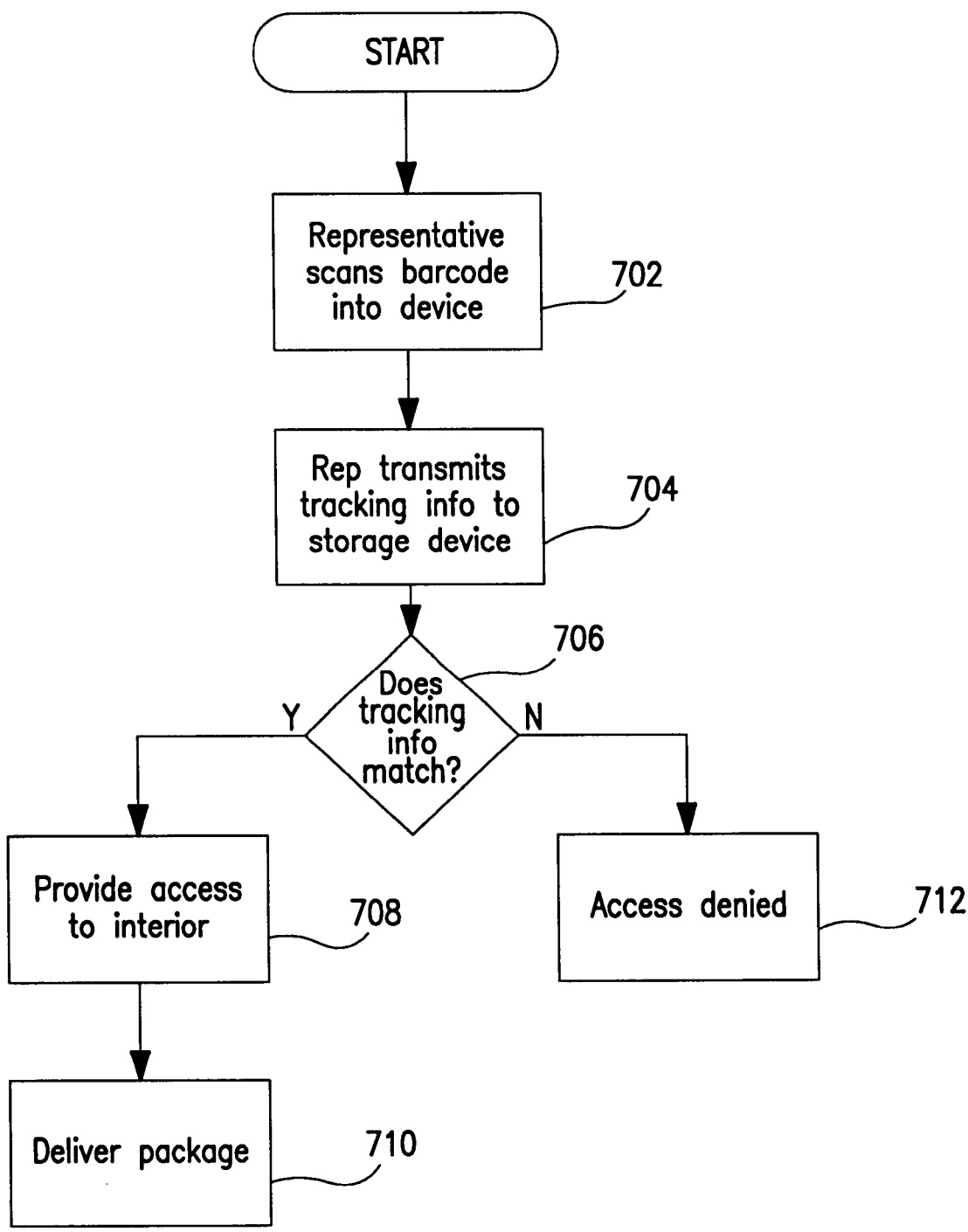
FIG. 7 is a flowchart of a method for accessing an unattended storage device using a tracking number according to, an embodiment of the present invention.

Referring to FIG. 7, a method for accessing an unattended storage device using tracking information, according to a fifth embodiment of the present invention, is described. As discussed above, when the customer places an order with a merchant, the merchant may request the pick-up of the item from the logistics company, which may transmit tracking information to, among others, the storage device. In step 702, when the item is about to be delivered to the storage device by the logistics company representative, the logistics company representative may scan the barcode on the exterior of the item into a portable handheld device (discussed above), to retrieve the tracking information for the item. In step 704, the representative may transmit the tracking information to the storage device. In step 706, the storage device may determine whether the tracking information provided by the representative matches tracking information stored in a memory. In step 708, if the tracking information matches tracking information in the memory, the representative is provided with access to the interior of the storage device, and, in step 710, the representative delivers the item.

In step 712, if the tracking number does not match, access is denied. In essence, the tracking information in this embodiment serves as an access code for accessing the device. In a modification of the above-described fifth embodiment, the tracking number may serve as an access code for accessing the device.

Figure 8:
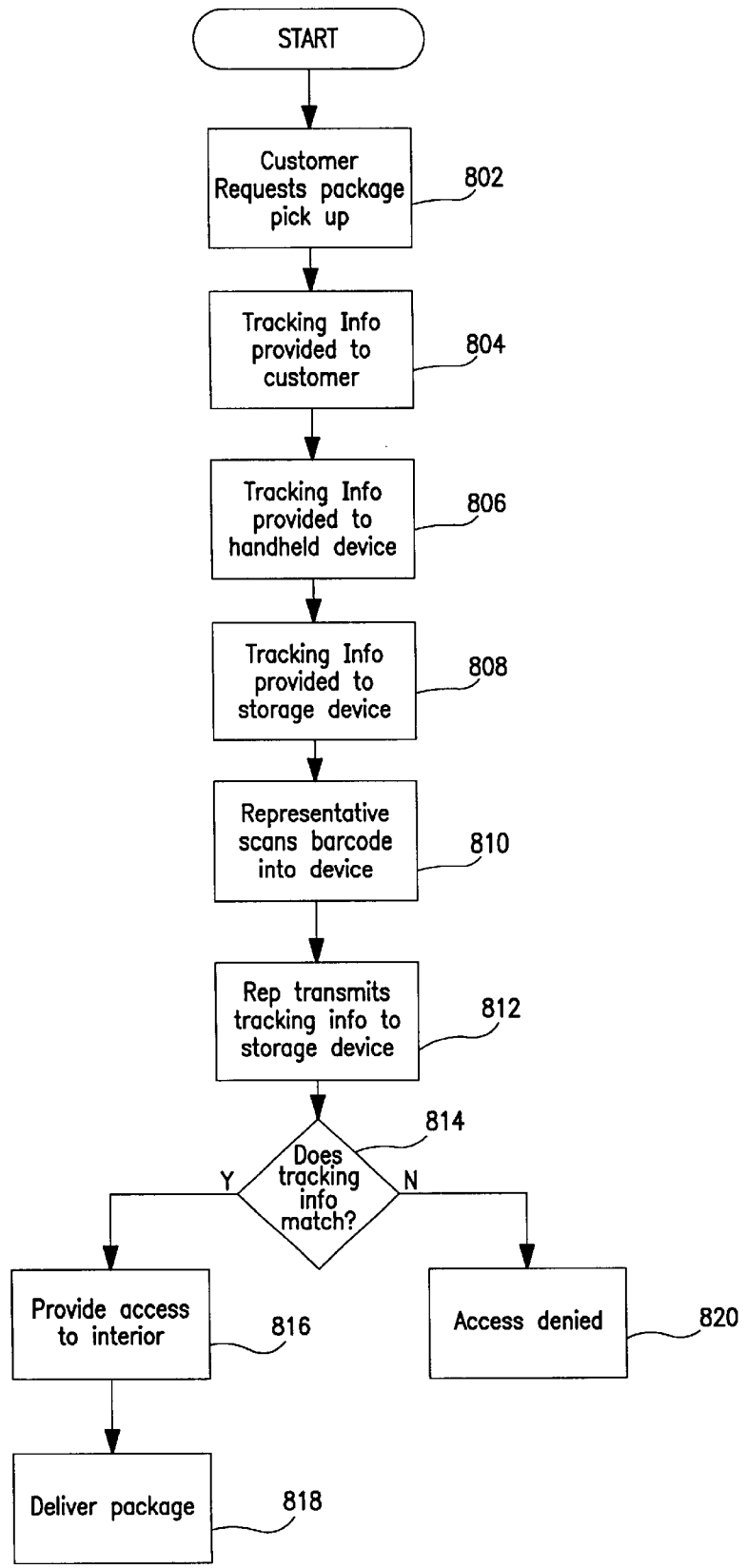
FIG. 8 is a flowchart of a method for accessing an unattended storage device for pick up of items using a tracking number according to an embodiment of the present invention.

A similar method may be used to provide access to the storage device during an item pick-up. Referring to FIG. 8, in step 802, when the logistics company receives a request from a customer for a pick-up, the logistics company, in step 804, may provide tracking information for the customer, and may transmit this information to the representative, who will pick up the item. The tracking information may be stored in a memory. In one embodiment, as shown in step 806, the tracking information may be stored in the memory of the portable handheld device. In a modification of the above-described fifth embodiment, as shown in step 808, the tracking information may be stored in the memory of the storage device.

In step 810, when the representative approaches the storage device, the representative may transmit the tracking information to the storage device. As discussed above, the tracking information may be processed and may transmit a digital signature. In one embodiment, as shown in step 812, the storage device may process the tracking information and match the tracking information with one stored in the memory. Alternatively, this may be done by the central operations center. In step 814, if the tracking information matches the one stored in the memory, in step 816 the storage device opens, and, in step 818, the representative may remove the item for shipment. If the tracking number does not match one stored in the memory, in step 820, the storage device will not open.

Referring again to FIG. 1, a system for delivery to an unattended storage device, according to a sixth embodiment, is described. As was described above, customer 102 may purchase merchandise from merchant 104, which may be a merchant operating a web-site on the Internet. Customer 102 may have unattended storage device 106 at his or her service. When customer 102 purchases merchandise from merchant 104, it is delivered by logistics company 108 to storage device 106.

Figure 9:
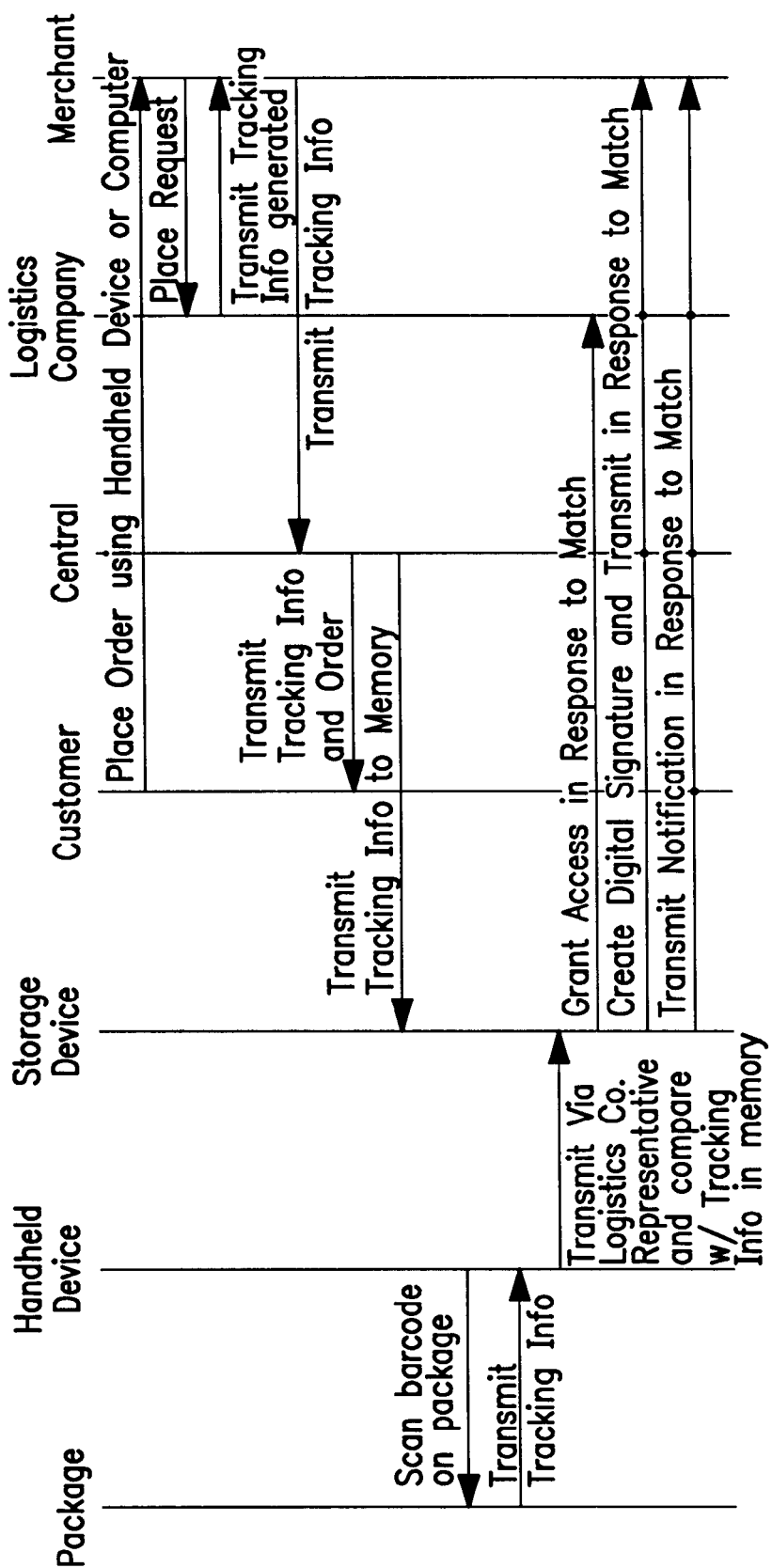
FIG. 9 is a flowchart of a system for providing access to an unattended storage device according to an embodiment of the present invention.

Referring to FIG. 9, when the customer sees an item they may want to purchase, the customer may use a portable handheld device to place an order with a merchant by scanning the item's barcode with the portable handheld device. The handheld device may be wirelessly connected to the Internet or, alternatively, to a private data network. The order may be transmitted with any prevalent two-way wireless communication technology, such as cellular or PCS service, radio-frequency, or beamed to satellite line of sight. Alternatively, the transmission may be short range, such as line of sight or "walkie-talkie" radio, and boosted or amplified by another device, or may be by RF or IR signal.

Further, the wireless transmission may allow the customer to surf or browse the Internet or a proprietary data source from the remote location. The customer may do so to compare prices, and the device may be operably coupled to a central operations center that facilitates this process (i.e., by keeping such data continually updated and available on a proprietary data network.) Thus, the customer may evaluate the quality of the price that they are getting. The customer also may conduct research about the particular product.

If the customer decides that they want to purchase the product, they may do so with the handheld device. The handheld device may be specifically designed for its remote shopping-enabling purpose. Alternatively, the construct may be a software application resident on a third party device, such as an application that would reside on a PDA-based device, such as a PalmPilot® PDA, or a Universal Portable Device (UPD) product. The ability to place the software as a resident application on a third party device is a functionality that may also shared by the agency software.

The handheld device, or alternatively, the application may contain and feature software similar to agency software described below. The agency software may determine when the customer order should leave the merchant's warehouse and enter the delivery channel. This determination may be made based upon the characteristics of the order (weight, size, number of parcels, cost thereof, distance to be transported, and the like) and historical data about the punctuality and efficiency of various shipping companies. The software may store the results of a customer's previous shipment experiences over time, e.g., how long it took the item to be delivered, whether or not the delivery was satisfactory and had to be returned, whether or not the item arrived over a weekend, and uses this information in a learned manner to make predictions about future delivery timeframes.

The software application may store customer's credit card information and may be able to beam it to the merchant. The data transfer may occur with or without wires, and may be directed to a credit card processing terminal or to a cash register capable of receiving such transmission. Further, payment may be made through electronic check or electronic wallet or even a type of digital cash stored on a smart, plastic card, a "smart card" or "Mondex-type" digital cash card, which may be plugged into a PCM/IA or similar port on a computer, cash register, or card processing terminal that may transmit payment information. Thus, the handheld device may be able to effect payment without the customer having to present a form of payment such as cash, check, credit, debit card, and the like, on site (e.g., without necessarily a physical instrument.) The handheld device may generate digital signatures, as previously decribed, to assure security of the transaction.

The handheld device may generate unique vendor codes (or other transaction identifying codes), which identify the transaction and communicate those codes via the wireless two-way communication link to the central operations center and also to the actual home delivery unit (e.g., the storage device). Thus, the handheld device may allow for remote purchasing of goods, with anonymity intact, and without the need to present physical forms of payment, or having convenient means of product transport.

Figure 10:
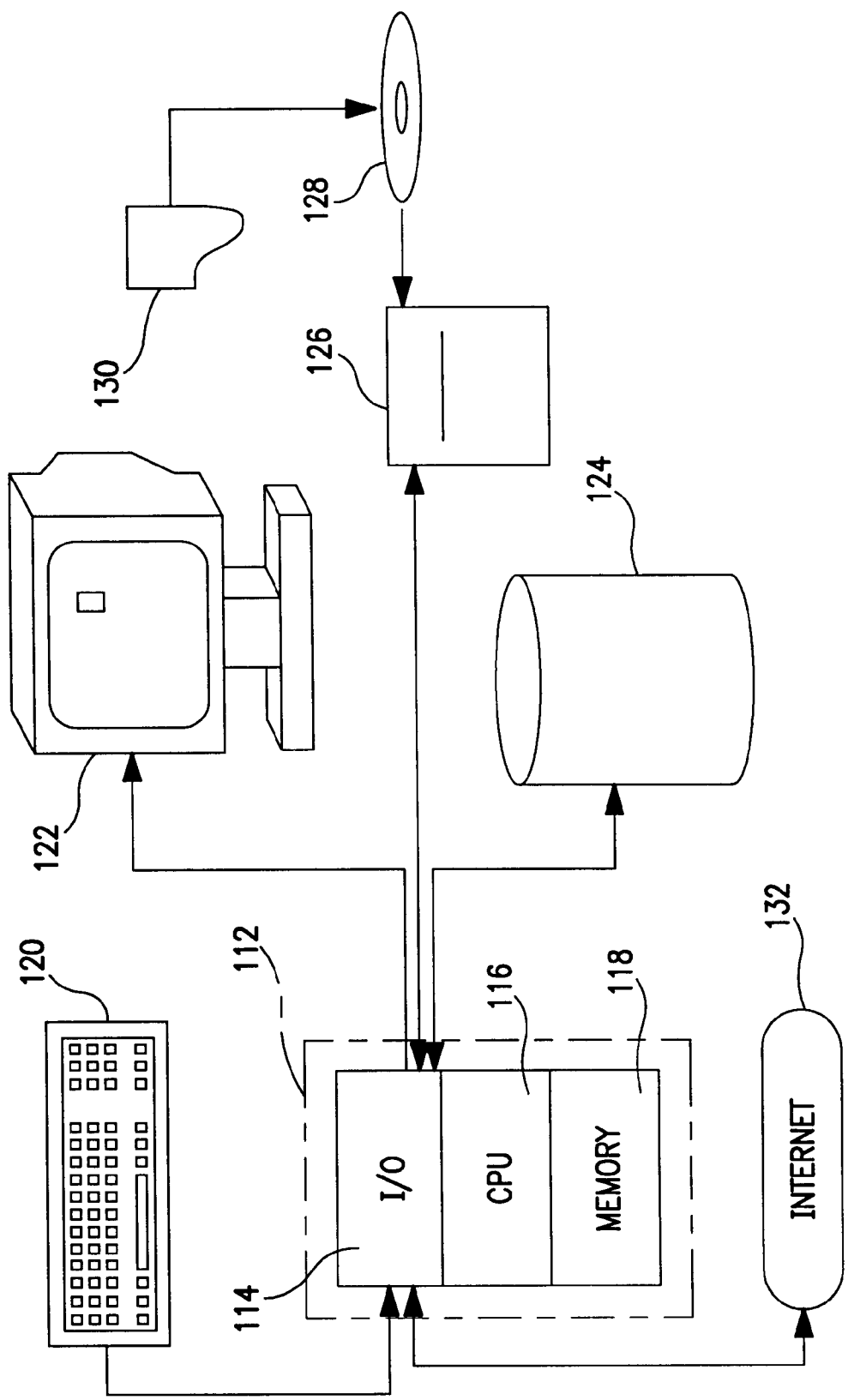
FIG. 10 is a schematic of a computer system according to an embodiment of the present invention.

In a modification of the above-described sixth embodiment, the customer may use a computer system to place an order for the purchase of an item from a merchant. Referring to FIG. 10, in this modified embodiment, processor 112 has input/output ("I/O") section 114, central processing unit ("CPU") 116, and memory section 118. I/O section 114 may be connected to keyboard 120, display unit 122, disk storage unit 124, and CD-ROM drive unit 126. CD-ROM unit 126 may read a CD-ROM medium 128, which typically contains programs and data 130. Processor 112 may be connected to the Internet via connection 132. Thus, the customer may place an order for an item with a merchant using the computer system.

Figure 11:
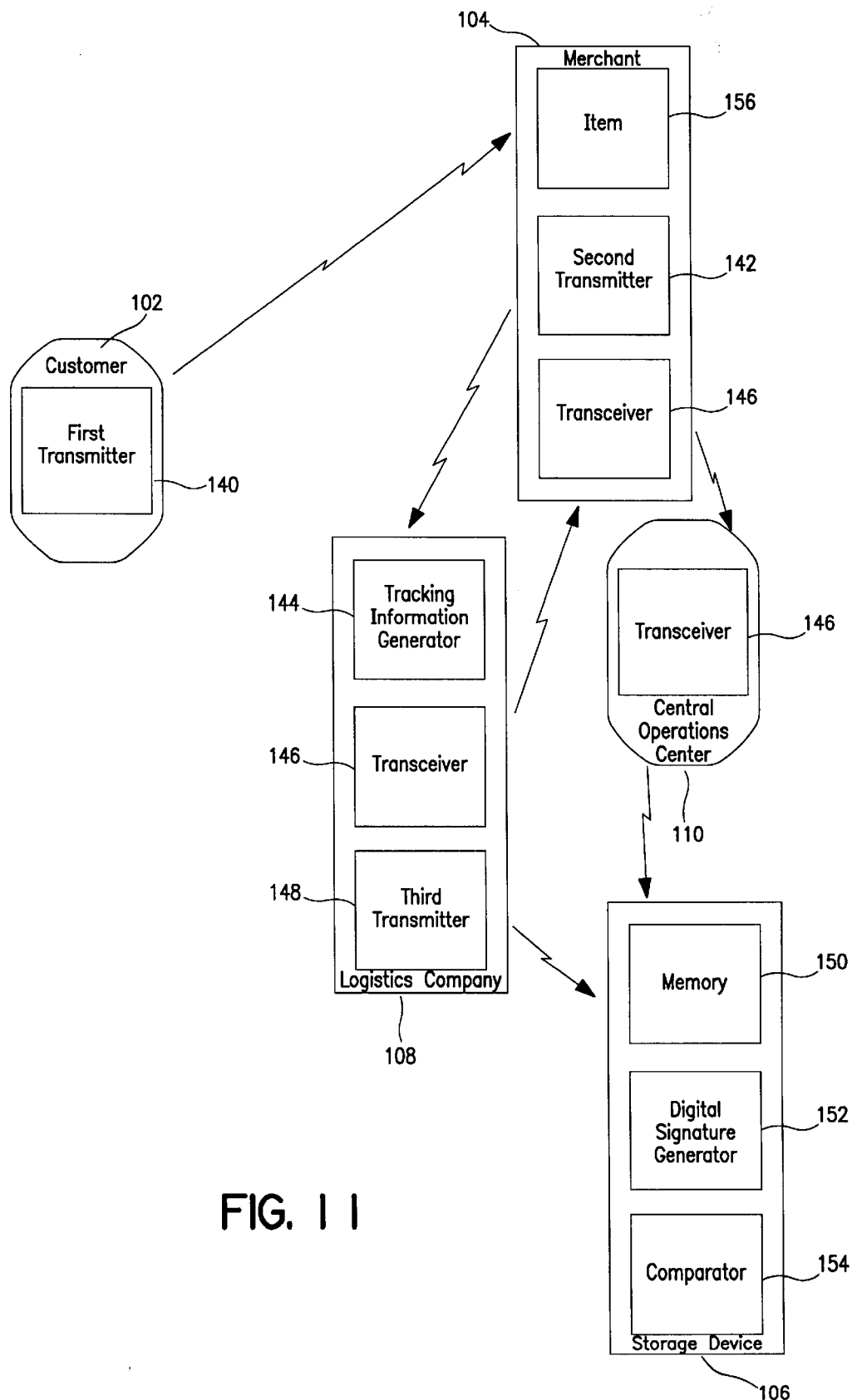
FIG. 11 is a schematic of a system for providing access to an unattended storage device according to an embodiment of the present invention.

Referring to FIG. 11, a schematic for, a system for providing access to an unattended storage device; according one embodiment of the present invention, is described. Customer 102 may place an order for an item 156 with merchant 104 using a first transmitter 140. The merchant 104 may then request pick-up of the item 156 from a logistics company 108 using a second transmitter 142. Further, the logistics company 108 may generate tracking information for the item 156 using a tracking generator 144. The logistics company 108 then may transmit the tracking information to the merchant 102 using a transceiver 146, who further may transmit the tracking information to a central operations center 110 using the transceiver 146. The central operations center 110 further may transmit the tracking information to a memory 150 of a storage device 106 using the transceiver 146. The storage device 106 may also create a digital signature using a digital signature generator 152, by processing the tracking information using a hash function. A representative of logistics company 108 may obtain the tracking information using a third transmitter 148, and also may transmit the tracking information to the storage device via the third transmitter 148. A comparator 154, which may be the storage device 106, may compare the tracking information transmitted to the storage device 106 via the third transmitter 148 with the information stored in the memory 150 of the storage device 106. In response to a match, storage device 106 may open to allow pick-up or delivery of the item 156.

Referring again to FIGS. 9, once the customer places an order for the purchase of an item from a merchant, the merchant may request the pick-up of the ordered item. The request may be accomplished by using the above described computer system. Moreover, this request for pick-up may be made to a logistics company. Further, in response to the request for pick-up, tracking information may be generated. This tracking information may be generated by the logistics company, and may also be generated using the computer system. In addition, this tracking information may be transmitted to the merchant, who further may transmit the tracking information to a central operations center. The central operations center further may transmit the tracking information to a storage device and to the customer. Alternatively, the generated tracking information may be transmitted to the central operations center, bypassing transmission to the merchant. Further, the generated tracking information also may be directly transmitted to the storage device from the logistics company, bypassing transmission to the merchant and the central operations center. All of the above described transmissions may be accomplished using the computer system.

Moreover, a digital signature may be created by processing the tracking information. This digital signature may be created by a-hash function. The storage device, once it receives the tracking information, may create the digital signature. Alternatively, the digital signature may be created by a central operations center, which also may download the digital signature to the storage device.

Further, the tracking information may be transmitted to a memory. The transmission may be accomplished using the computer system. The memory may be that of the storage device, or alternatively, the memory may be that of a handheld device.

In addition, the tracking information also may be transmitted to a logistics company representative. The logistics company representative may receive the tracking information from a handheld device, such as by scanning a bar code on the exterior of an item into the handheld device. Alternatively, the tracking information may be received by the logistics company representative using the tracking number. Moreover, once the tracking information is received by the logistics company representative, it further may be transmitted to the storage device via the logistics company representative by using the handheld device, or alternatively, by using the tracking number. Further, once the tracking information is transmitted to the storage device, it may be compared to the tracking information stored in a memory. The comparison may be done by the storage device, or, alternatively, the comparison may be done by the handheld device. If there is a match, the storage device may open to allow delivery or pickup of the item.

In addition, in response to a match, the digital signature may be transmitted to the merchant, the logistics company, or the central operations center, or any combination thereof.

In one embodiment, the storage device may transmit the digital signature in response to a match. Further, a notification may be transmitted to the merchant, the logistics company, the central operations center, or the customer, or any combination thereof. In one embodiment, the storage device may transmit the notification in response to a match.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from Ea consideration of the specification or practice of the invention disclosed- herein. It is intended that the specification is considered as exemplary only, with the true scope and spirit of the invention being indicated by the following claims.

What is claimed is:

1. A method for delivery to an unattended storage device and receiving a digital signature comprising:
   receiving tracking information, wherein said tracking information comprises delivery information for an item;
   obtaining a digital signature, wherein the digital signature is created by processing the tracking information; and
   transmitting the digital signature to a third party.

2. The method of claim 1, wherein the step of processing the tracking information further comprises the step of processing the tracking information by a hash function.

3. The method of claim 1, wherein the tracking information is processed by a storage device.

4. The method of claim 1, wherein the tracking information is processed by a third party.

5. The method of claim 1, wherein the step of obtaining the digital signature further comprises the step of processing the tracking information.

6. The method of claim 1, wherein the step of processing the tracking information comprises:
   generating a message including the tracking information and a timestamp.

7. The method of claim 1, wherein the step of transmitting the digital signature includes transmitting the digital signature indirectly to the third party via the logistics company.

8. A method for registering a digital signature comprising:
   registering a customer with a certificate authority, wherein said certificate of authority stores customer information and verifies the accuracy of said digital signature;
   creating a private key;
   creating a public key; and
   granting a logistics company access to the public key.

9. The method of claim 8, further comprising:
   registering the customer with a central operations center prior to the registering of the customer with the certificate authority.

10. The method of claim 8, wherein the certificate authority stores customer information.

11. The method of claim 8, wherein the customer is registered with the certificate authority by a third party.

12. The method of claim 9, wherein the central operations center is the certificate authority.

13. The method of claim 8, where the step of creating a private key further comprises the step of passing the private key to a storage device.

14. The method of claim 8, where the step of creating a private key further comprises the step of retaining the private key.

15. A method for delivery to unattended storage device and receiving a digital signature comprising:
   receiving an order from a customer;
   requesting pick-up of the item from a logistics company; and
   receiving a digital signature, wherein the digital signature is created by processing tracking information, wherein said tracking information comprises delivery information for said item.

16. The method of claim 15, wherein the step of processing the tracking information further comprises the step of processing the tracking information by a hash function.

17. The method of claim 15, further comprising: transmitting the tracking information to a storage device.

18. The method of claim 17, wherein the step of transmitting the tracking information to the storage device further comprises the step of transmitting the tracking information to the storage device indirectly via a third party.

19. The method of claim 15, wherein the tracking information is processed by a storage device.

20. The method of claim 15, wherein the tracking information is processed by a third party.

21. The method of claim 15, wherein the step of receiving the digital signature further comprises the step of processing the tracking information.

22. The method of claim 15, wherein the step of processing the tracking information comprises:
   generating a message including the tracking information and a timestamp.

23. A method for delivery to unattended storage device and receiving a digital signature comprising:
   receiving a request for a pick-up of an item;
   transmitting tracking information to a storage device, wherein said tracking information comprises delivery information for said item; and
   receiving a digital signature, wherein the digital signature is created by processing tracking information.

24. The method of claim 23, wherein the step of transmitting the tracking information to the storage device further comprises the step of transmitting the tracking information to the storage device indirectly via a third party.

25. The method of claim 23, wherein the step of processing the tracking information further comprises the step of processing the tracking information by a hash function.

26. The method of claim 23, wherein the tracking information is processed by a storage device.

27. The method of claim 23, wherein the tracking information is processed by a third party.

28. The method of claim 23, wherein the step of receiving the digital signature further comprises the step of processing the tracking information.

29. The method of claim 23, wherein the step of processing the tracking information comprises:
   generating a message including the tracking information and a timestamp.

30. A method of providing remote access to an unattended storage device comprising:
   transmitting tracking information to a storage device, wherein said tracking information comprises pick-up information for said item or delivery information for said item; and
   gaining access to an interior of the storage device if the tracking information transmitted to the storage device matches tracking information stored in a memory.

31. The method of claim 30, wherein the step of transmitting the tracking information to the storage device further comprises transmitting the tracking information indirectly to the storage device via a third party.

32. The method of claim 30, further comprising:
determining whether the tracking information transmitted matches the tracking information stored in the memory.

33. The method of claim 32, wherein the storage device determines whether the tracking information transmitted matches the tracking information stored in the memory.

34. The method of claim 32, wherein a central operations center determines whether the tracking information transmitted matches the tracking information stored in the memory.

35. The method of claim 30, further comprising:
transmitting a digital signature in response to a match to at least one recipient selected from the group consisting of a merchant, a logistics company, and a central operations center.

36. The method of claim 35, wherein the digital signature is transmitted once an access door of the storage device has been closed.

37. The method of claim 30, further comprising:
providing at least one notification to at least one recipient selected from the group consisting of a merchant, a logistics company, a central operations center and a merchant.

38. The method of claim 30, wherein the step of transmitting tracking information to the storage device further comprises transmitting tracking information from a handheld device to the storage device.

39. The method of claim 38, wherein the tracking information is transmitted by IR signal.

40. The method of claim 38, wherein the tracking information is transmitted by RF signal.

41. The method of claim 38, wherein the tracking. information is wirelessly transmitted.

42. The method of claim 30, wherein the step of transmitting the tracking information to the storage device further comprises transmitting the tracking information indirectly to the storage device via a third party.

43. A method for providing remote access to an unattened storage device for the pick-up of an item comprising:
receiving a request for the pick-up of an item;
generating tracking information for the item, wherein said tracking information comprises pick-up information for said item;
transmitting the tracking information to a memory;
transmitting the tracking information to the storage device; and
gaining access to an interior of the storage device if the tracking information transmitted to the storage device matches the tracking information stored in the memory.

44. The method of claim 43, further comprising:
determining if the tracking information transmitted matches the tracking information stored in the memory of the storage device.

45. The method of claim 43, wherein the storage device determines whether the tracking information transmitted matches the tracking information stored in the memory.

46. The method of claim 43, wherein a central operations center determines whether the tracking information transmitted matches the tracking information stored in the memory.

47. The method of claim 43, wherein the step of transmitting the tracking information to the memory further comprises transmitting the tracking information indirectly to the memory via a third party.

48. The method of claim 43, wherein the step of transmitting tracking information to the storage device further comprises transmitting tracking information from a handheld device to the storage device.

49. The method of claim 48, wherein the tracking information is transmitted by IR signal.

50. The method of claim 48, wherein the tracking information is transmitted by RF signal.

51. The method of claim 48, wherein the tracking information is wirelessly transmitted.

52. The method of claim 43, wherein the step of transmitting the tracking information to the storage device further comprises transmitting the tracking information indirectly to the storage device via a third party.

53. A system for providing access to an unattended storage device comprising:
a first transmitter for placing an order for an item with a merchant;
a second transmitter for transmitting a request for a pick-up of the item;
a tracking information generator for generating tracking information in response to a request for a pick-up of the item, wherein said tracking information comprises pick-up information for said item or delivery information for said item;
a transceiver for receiving and transmitting the tracking information;
a memory for storing the tracking information;
a third transmitter for transmitting the tracking information to a storage device
a comparator for comparing the tracking information transmitted to the storage device to the tracking information stored in the memory; and
a digital signature generator for creating a digital signature.

54. The system of claim 53, wherein the first transmitter is a computer system.

55. The system of claim 53, wherein the first transmitter is a portable handheld device.

56. The system of claim 53, wherein the first transmitter is a connected to the Internet.

57. The system of claim 53, wherein the first transmitter is a connected to a private data network.

58. The system of claim 53, wherein the first transmitter transmits the order by IR signal.

59. The system of claim 53, wherein the first transmitter transmits the order by RF signal.

60. The system of claim 53, wherein the first transmitter wirelessly transmits the order.

61. The system of claim 53, wherein the second transmitter is adapted for use by a merchant.

62. The system of claim 53, wherein the second transmitter is a computer system.

63. The system of claim 53, wherein the generator is adapted for use by a logistics company.

64. The system of claim 53, wherein the generator is a computer system.

65. The system of claim 53, wherein the transceiver is adapted for use by at least one user selected from the group consisting of a merchant, a logistics company, and a central operations center.

66. The system of claim 65, wherein the transceiver is further adapted for transmitting the tracking information to the memory.

67. The system of claim 53, wherein the transceiver is computer system.

68. The system of claim 53, wherein the memory is that of the storage device.

69. The system of claim 53, wherein the third transmitter is adapted for use by a logistic company representative.

70. The system of claim 53, wherein the third transmitter is a handheld device.

71. The system of claim 53, wherein the-third transmitter is a tracking number.

72. The system of claim 53, wherein the comparator is the storage device.

73. The system of claim 53, further comprising an opening mechanism for opening the storage device in response to a match between the tracking information transmitted to the storage device and the tracking information stored in the memory.

74. The system of claim 53, further comprising a digital signature generator for creating a digital signature.

75. The system of claim 74, wherein the digital signature is created by a hash function.

76. The system of claim 74, wherein the digital signature generator is at least one selected from the group consisting of: the storage device and a central operations center.

77. The system of claim 74, wherein the digital signature is downloaded to the storage device by a central operations center.

78. The system of claim 74, further comprising a fourth transmitter for transmitting the digital signature to at least one recipient selected from the group consisting of a merchant, a logistics company, and a central operations center.

79. The system of claim 74, further comprising a fifth transmitter for transmitting a notification to at least one recipient selected from the group consisting of a merchant, a logistics company, a central operations center, and a customer.

* * * * *